(12) United States Patent
Nitta et al.

(10) Patent No.: US 9,276,241 B2
(45) Date of Patent: Mar. 1, 2016

(54) MOLTEN SALT BATTERY CASE, AND MOLTEN SALT BATTERY

(75) Inventors: Koji Nitta, Osaka (JP); Shoichiro Sakai, Osaka (JP); Shinji Inazawa, Osaka (JP); Chihiro Hiraiwa, Osaka (JP); Atsushi Fukunaga, Osaka (JP); Masatoshi Majima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 430 days.

(21) Appl. No.: 13/335,242

(22) Filed: Dec. 22, 2011

(65) Prior Publication Data

US 2012/0100416 A1 Apr. 26, 2012

Related U.S. Application Data

(63) Continuation of application No. PCT/JP2011/059261, filed on Apr. 14, 2011.

(30) Foreign Application Priority Data

Apr. 16, 2010 (JP) ................... 2010-095055

(51) Int. Cl.
*H01M 2/02* (2006.01)
*H01M 10/054* (2010.01)
*H01M 10/0569* (2010.01)

(52) U.S. Cl.
CPC ............ *H01M 2/025* (2013.01); *H01M 2/0285* (2013.01); *H01M 10/054* (2013.01); *H01M 10/0569* (2013.01); *H01M 2300/0022* (2013.01); *H01M 2300/0045* (2013.01)

(58) Field of Classification Search
CPC .................. H01M 2/0285; H01M 10/0569
USPC ......... 429/122, 161, 162, 163, 174, 175, 176, 429/177, 178, 188, 304; 564/80
See application file for complete search history.

(56) References Cited

U.S. PATENT DOCUMENTS

2001/0021790 A1* 9/2001 Yonezawa et al. ............. 564/80
2009/0212743 A1* 8/2009 Hagiwara et al. ............. 320/137

FOREIGN PATENT DOCUMENTS

| EP | 1 862 452 A1 | 12/2007 | |
|---|---|---|---|
| JP | 59043839 | * 3/1984 | ............ C22C 21/06 |
| JP | 2000-348697 | * 12/2000 | ............ H01M 2/02 |
| JP | 2003-157890 A | 5/2003 | |
| JP | 2003-293059 | * 10/2003 | ............ B23K 26/00 |
| JP | 2006/100135 | * 9/2004 | ............ H01M 2/08 |
| JP | 2006-269374 | * 10/2006 | ............ H01M 10/40 |
| JP | 2007-172861 | * 7/2007 | ............ H01M 10/39 |
| JP | 2007-172861 A | 7/2007 | |
| JP | 2009-067644 | * 4/2009 | ............ Y02E 60/12 |

(Continued)

OTHER PUBLICATIONS

SciFinder Abstract with inherent 6061 Aluminum composition printed May 4, 2015.*

(Continued)

*Primary Examiner* — Patrick Ryan
*Assistant Examiner* — Aaron Greso
(74) *Attorney, Agent, or Firm* — Ditthavong & Steiner, P.C.

(57) ABSTRACT

The case for a molten salt battery is used for a molten salt battery containing as an electrolyte a molten salt containing sodium ions. The case is formed of aluminum or an aluminum alloy containing 90% by mass or more of aluminum.

2 Claims, 4 Drawing Sheets

(56) References Cited

FOREIGN PATENT DOCUMENTS

| JP | 2009-067644 A | | 4/2009 | |
| KR | 2005-093467 | * | 9/2005 | ................ C22F 1/04 |
| KR | 10-2007-0114323 A | | 11/2007 | |
| WO | WO 2006/101141 | * | 9/2006 | ............ C07C 311/48 |
| WO | WO 2006/101141 A1 | | 9/2006 | |
| WO | WO 2009/110484 | * | 9/2009 | ............. H01M 2/34 |
| WO | WO 2009/123328 | * | 10/2009 | ............ C01B 21/086 |
| WO | WO 2011/036907 A1 | | 3/2011 | |

OTHER PUBLICATIONS

Electrochemical properties of alkali bis (trifluoromethylsulfonyl) amides and their eutectic mixtures, Electrochimica Acta, Jan. 1, 2010, vol. 55, Issue 3, p. 1113-1119.

International Search Report of PCT Application No. PCT/JP2011/059261, mailing date: Jul. 5, 2011.

Soduim secondary batteries operating at intermediate temperature using binary molten NaTFSA-CsTFSA2, Japan Battery Symposium, Nov. 30, 2009, vol. 50, p. 234.

International Preliminary Report on Patentability for International Application No. PCT/JP2011/059261, dated Nov. 6, 2012, pp. 1-6.

* cited by examiner

| | Si | Fe | Cu | Mn | Mg | Cr | Zn | Ti |
|---|---|---|---|---|---|---|---|---|
| 1050 | 0.25 | 0.40 | 0.05 | 0.05 | 0.05 | — | 0.05 | 0.03 |
| 5052 | 0.25 | 0.40 | 0.10 | 0.10 | 2.2~2.8 | 0.15~0.35 | 0.10 | — |
| 6061 | 0.40~0.8 | 0.7 | 0.15~0.40 | 0.15 | 0.8~1.2 | 0.04~0.35 | 0.25 | 0.15 |

(% by mass)

MOLTEN SALT BATTERY CASE, AND MOLTEN SALT BATTERY

FIELD OF THE INVENTION

The present invention relates to a material for a case for a molten salt battery.

BACKGROUND OF THE INVENTION

As described in Patent Document 1, a molten salt containing sodium ions is used for an electrolyte of a molten salt battery. The oxidation-reduction reaction of a sodium compound is performed on the positive electrode of a molten salt battery. The oxidation-reduction reaction of sodium ions is performed on the negative electrode of a molten salt battery.

PRIOR ART DOCUMENT

Patent Document

Patent Document 1: Japanese Laid-Open Patent Publication No. 2009-67644

SUMMARY OF THE INVENTION

A case for a molten salt battery is influenced by oxidation reaction of the positive electrode or reduction reaction of the negative electrode. This provides an oxidizing atmosphere in a case on the side of the positive electrode. Therefore, material for the case is selected in consideration of corrosion from oxidization of a sodium compound. In the case on the side of the negative electrode, material for the case forms an alloy with sodium when sodium is deposited. Therefore, material for the case is selected in consideration of deterioration from alloying. However, material for the case has not yet been researched in detail.

An objective of the present invention is to provide a case for a molten salt battery in which a molten salt containing sodium ions is used as an electrolyte, wherein the case has reduced deterioration from corrosion.

To achieve the foregoing objective and in accordance with one aspect of the present invention, a case for a molten salt battery is provided, in which the case is used for a molten salt battery containing as an electrolyte a molten salt containing a sodium ion. Also, the case is formed of aluminum or an aluminum alloy containing 90% by mass or more of aluminum.

When charging and discharging of a molten salt battery are performed, the positive electrode side of the case will be in a state where oxidation reaction of aluminum occurs, and the negative electrode side of the case will be in a state where a reduction reaction occurs. However, aluminum is almost immune to being oxidized in the electrolyte containing sodium ions. Further, if aluminum has a negative potential in the electrolyte containing sodium ions, sodium metal will be deposited on aluminum by the reduction reaction of the sodium ions. Although the sodium metal on aluminum is ionized at the time of discharge, almost no deterioration of aluminum by the dissolution of sodium ions occurs. Therefore, a case for a molten salt battery can be formed of an aluminum alloy to thereby suppress the corrosion of the case.

In the case described above, the case is used for a molten salt battery containing as an electrolyte a molten salt containing an anion represented by the following formula (1) and a cation of at least one of an alkali metal and an alkaline earth metal:

[Formula 1]

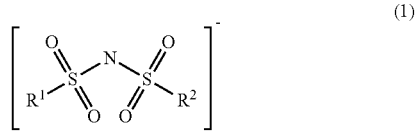

(where $R^1$ and $R^2$ each independently denote fluorine or a fluoroalkyl group.)

In a molten salt battery containing as an electrolyte a molten salt comprising the above anion and the above cation, aluminum is not corroded by the oxidation-reduction reaction at the time of discharging and charging. Therefore, a case of the present invention is suitable as a case for a molten salt battery containing as an electrolyte a molten salt containing sodium ions.

In order to solve the problems as described above, a second aspect of the present invention provides a molten salt battery using a case for a molten salt battery as described above. According to this invention, deterioration of the case can be suppressed.

DETAILED DESCRIPTION OF THE PREFERRED EMBODIMENTS

Figures 1, 2:
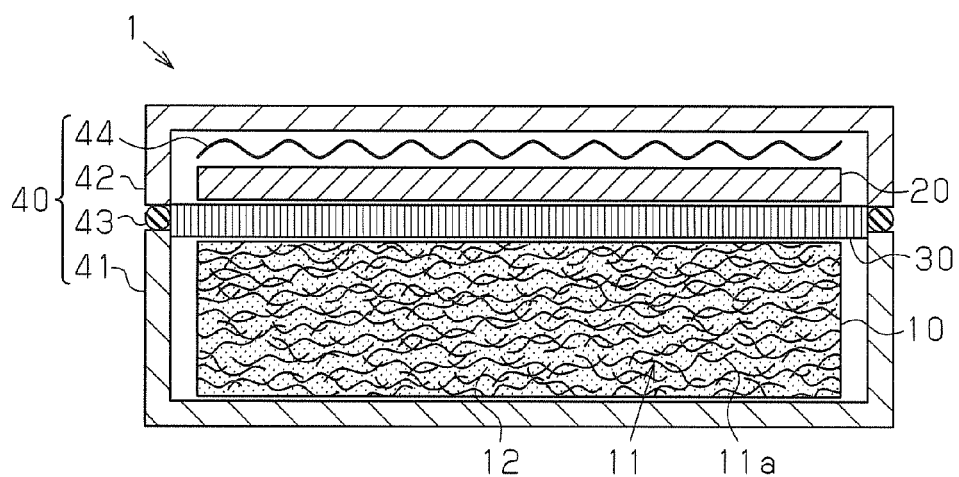
FIG. 1 is a schematic diagram showing a molten salt battery according to one embodiment of the present invention.
FIG. 2 is a table showing the composition ratio of the case for a molten salt battery.

One embodiment of the present invention will be described with reference to FIG. 1.

A molten salt battery 1 comprises a positive electrode 10, a negative electrode 20, a separator 30 arranged between the positive electrode 10 and the negative electrode 20, and an accommodation case 40 for accommodating the positive electrode 10, the negative electrode 20, and the separator 30. The accommodation case 40 is filled with a molten salt.

The accommodation case 40 comprises a positive electrode case 41 electrically connected with the positive electrode 10, a negative electrode case 42 electrically connected with the negative electrode 20, a sealing member 43 for sealing the space between the positive electrode case 41 and the negative electrode case 42, and a plate spring 44 for pressing the negative electrode 20 toward the positive electrode 10.

The positive electrode case 41 functions as a positive electrode terminal connected to an external apparatus. The negative electrode case 42 functions as a negative electrode terminal connected to an external apparatus. The sealing member 43 is formed of a fluorine-based elastic member. The fluorine-based elastic member is not corroded by positive electrode active material, negative electrode active material, and molten salt. The positive electrode case 41 and the negative electrode case 42 are formed of an aluminum alloy that is a conductive member. The aluminum alloy is not corroded by the oxidation-reduction reaction by charging and discharging of the molten salt battery 1.

The positive electrode 10 comprises a current collector 11 and a positive electrode composition 12 containing a positive electrode active material. The current collector 11 collects the charge generated by the oxidation-reduction reaction of the positive electrode active material. An aluminum nonwoven fabric is used as the current collector 11. A plurality of small spaces are formed in the inner part of the aluminum nonwoven fabric. The small spaces in the aluminum nonwoven fabric are filled with the positive electrode composition 12.

The positive electrode 10 is formed as follows. $NaCrO_2$ as a positive electrode active material, acetylene black, polyvinylidene fluoride, and N-methyl-2-pyrrolidone are mixed in a mass ratio of 85:10:5:50, respectively, to form the positive electrode composition 12. The acetylene black is used as a conducting material. The polyvinylidene fluoride is used as a binder resin. The N-methyl-2-pyrrolidone is used as a solvent.

Next, an aluminum nonwoven fabric having a diameter of 100 μm and a porosity of 80% is prepared. This aluminum nonwoven fabric is filled with the positive electrode composition 12. After drying, the aluminum nonwoven fabric is pressed at a pressure of 1000 kgf/cm². The porosity is defined by the proportion of the aluminum nonwoven fabric to the total volume of the same nonwoven fabric.

A salt (hereinafter, NaFSA-KFSA) containing an anion (hereinafter, "FSA") represented by the following formula (1), a sodium cation, and a potassium cation is used as a molten salt.

[Formula 1]

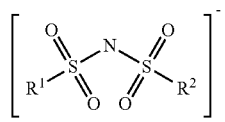

(1)

where $R^1$ and $R^2$ each denote F (fluorine). The composition of NaFSA-KFSA is 45 mol % and 55 mol %, respectively. The eutectic temperature thereof is the lowest in the case of the above composition, and it is 57° C.

An Sn—Na alloy is used as the negative electrode 20. The core part of the negative electrode 20 is Sn, and the surface of the negative electrode 20 is an Sn—Na alloy. The Sn—Na alloy is formed by plating in which Na is deposited on the Sn metal. The separator 30 isolates the positive electrode 10 from the negative electrode 20 so that the two electrodes may not be brought into contact with each other. The molten salt passes through the separator 30. The molten salt is brought into contact with the positive electrode 10 and the negative electrode 20. Specifically, a glass cloth having a thickness of 200 μm is used as the separator 30.

The corrosive deterioration of the aluminum alloy, which is the material for the positive electrode case 41 and the negative electrode case 42, will be described with reference to FIGS. 2 to 7.

FIG. 2 shows the composition of each test object. The test object is in accordance with the Japanese Industrial Standards. In all the aluminum alloys, the total amount of additives is less than 10% by mass.

<Oxidation Test 1>
Measurement method: A linear sweep voltammetric method (two-electrode type measurement)
Sample electrode: 1050, 5052, 6061 of the Japanese Industrial Standards in 2000 (refer to FIGS. 3 to 5)
Sample shape: A linear object of an aluminum alloy having a diameter of 1 mm
Immersion area of a sample: 0.314 cm² (1 cm in length)
Counter electrode: Na metal
Electrolyte: NaFSA-KFSA
Composition ratio of NaFSA-KFSA=45 mol %:55 mol %
Sweep rate: 10 mV·S$^{-1}$
Sweep range: 2.0 V to 4.0 V (vs. Na/Na$^+$)
Measurement temperature: 90° C.
Measurement frequency: 2 times
(Evaluation)

In the molten salt battery 1 of the above embodiment, the oxidation reaction is most promoted under a condition when the potential of the positive electrode is the highest. Therefore, the oxidative degradation is evaluated at the maximum potential. The maximum potential difference is 3.5 V in the molten salt battery 1 using $NaCrO_2$ as a positive electrode active material. Therefore, each sample is evaluated for the current density when the potential of the positive electrode is 3.5 V.

Figure 3:
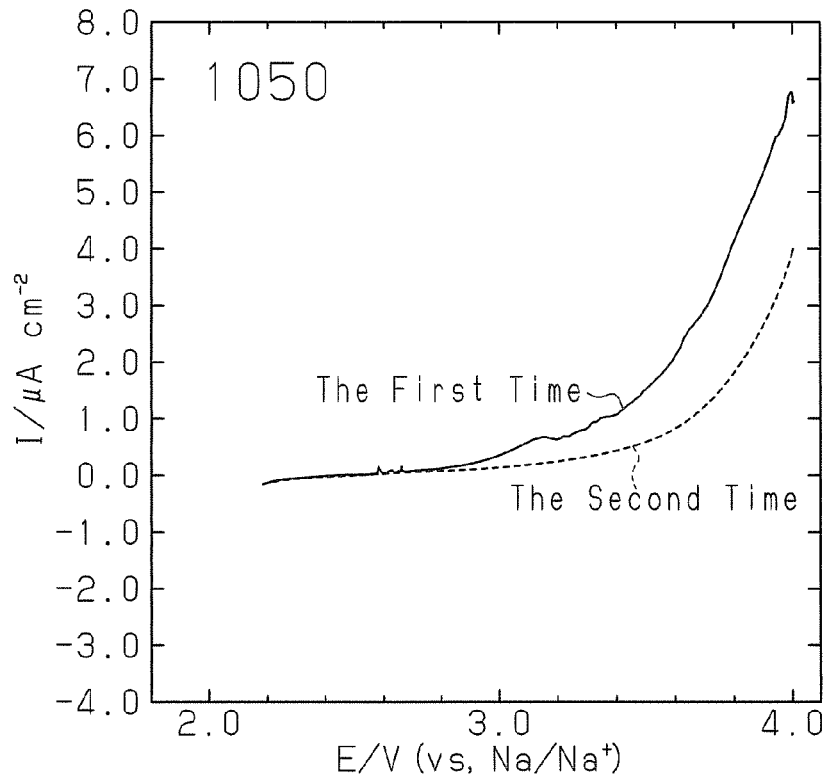
FIG. 3 is a graph showing the oxidation characteristics of aluminum 1050.
Figure 4:
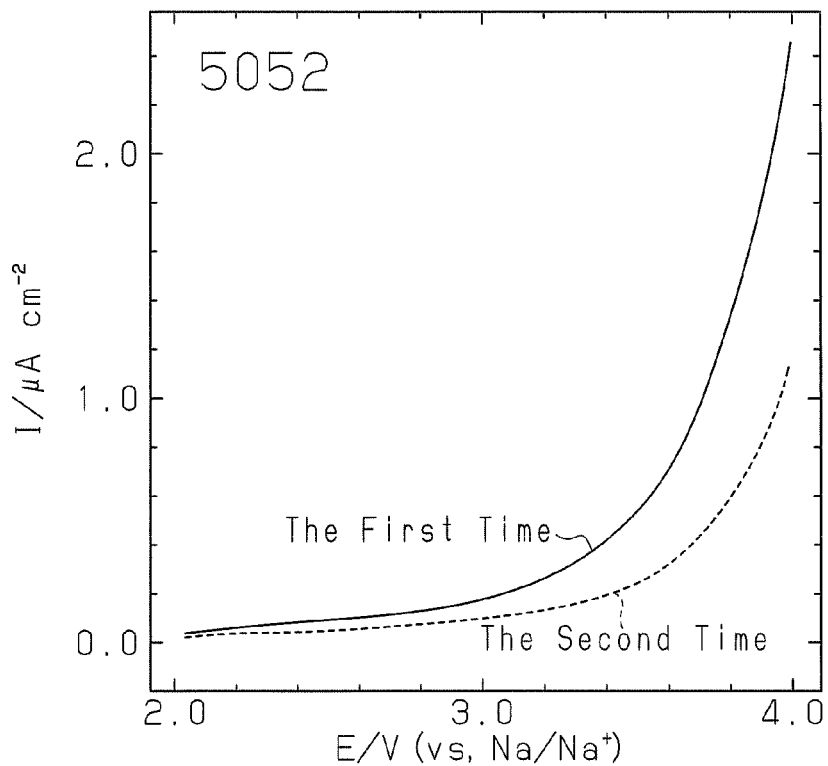
FIG. 4 is a graph showing the oxidation characteristics of aluminum 5052.
Figure 5:
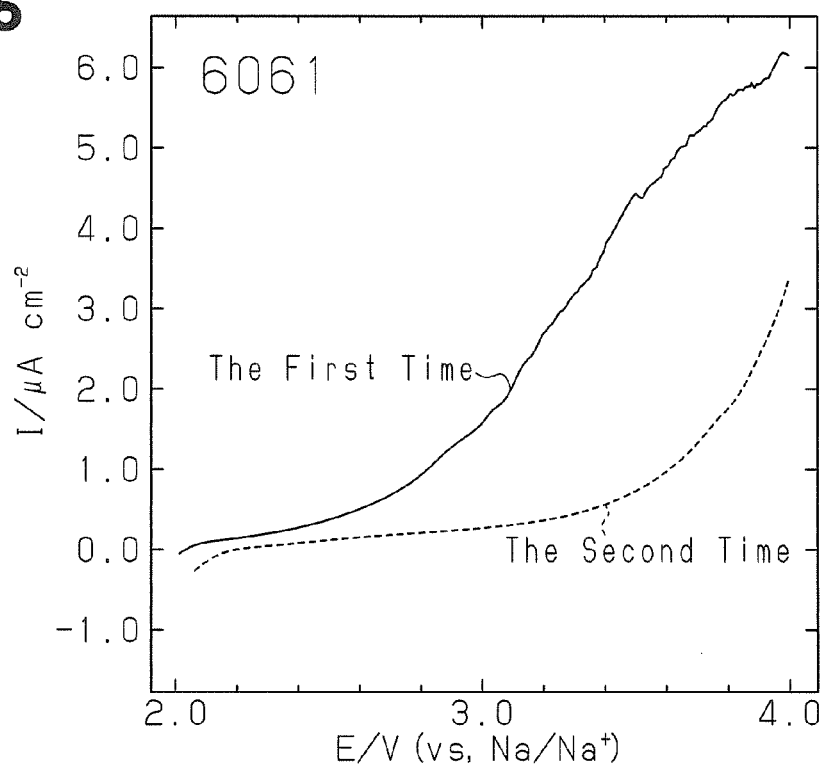
FIG. 5 is a graph showing the oxidation characteristics of aluminum 6061.

As shown in FIGS. 3 to 5, in all the samples, the current density at a potential of 3.5 V is 10 μAcm$^{-2}$ or less for both the first time of measurement and the second time of measurement. In addition, in all the samples, the current density at 3.5 V is lower for the second time than for the first time. With respect to the current generated by the oxidation reaction between an aluminum alloy and a sodium ion, the current flows irrespective of the number of times of measurement. Therefore, it is thought that the current of the present measurement is not caused by the oxidation reaction, but caused by the decomposition reaction of impurities such as water.

Further, the current density of all the samples is within the range of the current value that does not prevent charge and discharge. The maximum of the current value to be judged as not preventing charge and discharge (hereinafter, allowable current density) is, for example, set to 10 μAcm$^{-2}$ at a potential of 3.5 V. Thus, in all the samples, the current density at a potential of 3.5 V is smaller than the allowable current density.

<Oxidation Test 2>
Measurement method: A chronoamperometric method
Sample electrode: 1050, 5052, 6061 of the Japanese Industrial Standards in 2000 (refer to FIG. 6)
Sample shape: A linear object of an aluminum alloy having a diameter of 1 mm
Immersion area of a sample: 0.314 cm² (1 cm in length)
Counter electrode: Na metal
Electrolyte: NaFSA-KFSA
Composition ratio of NaFSA-KFSA=45 mol %:55 mol %
Holding potential: 3.5 V (vs. Na/Na$^{30}$)
Measurement temperature: 90° C.
(Evaluation)

For the same reason as in Test 1, each sample is evaluated for the current value in the state where the potential of the positive electrode is held at 3.5 V.

Figure 6:
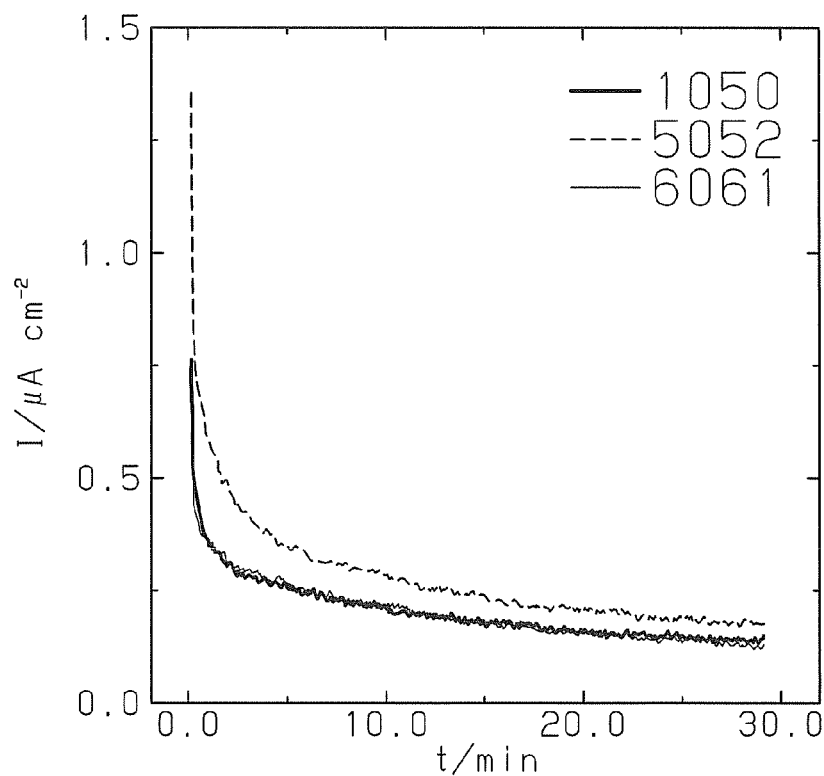
FIG. 6 is a graph showing the oxidation characteristics of various aluminum alloys.
Figure 7:
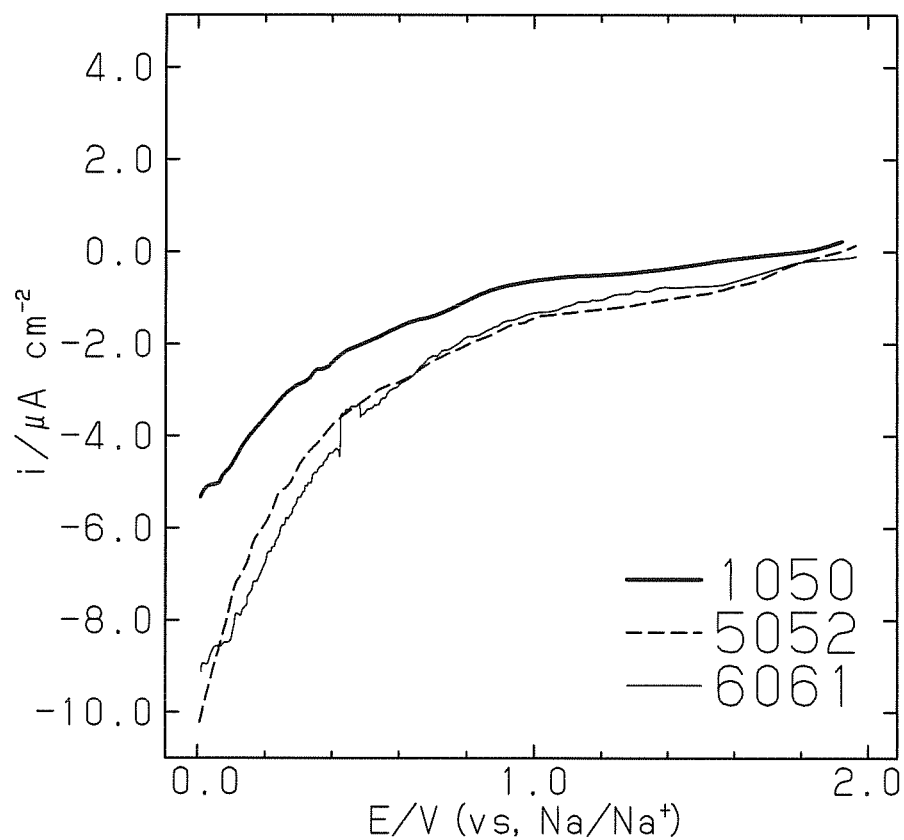
FIG. 7 is a graph showing the characteristics of various aluminum alloys in a reducing atmosphere.

As shown in FIG. 6, the current density decreases with the lapse of time for all the samples. With respect to the current generated by the oxidation reaction between an aluminum alloy and a sodium ion, the current flows irrespective of the lapse of time. Therefore, the current of the present measurement is not caused by the oxidation reaction. Further, the current density of all the samples is lower than the allowable current density of the molten salt battery 1.

<Reduction Test>
Measurement method: A linear sweep voltammetric method (two-electrode type measurement)
Sample electrode: 1050, 5052, 6061 of the Japanese Industrial Standards in 2000 (refer to FIG. 7)
Sample shape: A linear object of an aluminum alloy having a diameter of 1 mm
Immersion area of a sample: 0.314 cm$^2$ (1 cm in length)
Counter electrode: Na metal
Electrolyte: NaFSA-KFSA
Composition ratio of NaFSA-KFSA=45 mol %:55 mol %
Sweep rate: 5 mV·S$^{-1}$
Sweep range: 2.0 V to 0 V (vs. Na/Na$^+$)
Measurement temperature: 90° C.

In the measurement of current, the sweep is performed in the direction from 2.0 V to 0 V in analogy to the potential at the time of the charge of the molten salt battery 1. On the negative electrode 20 of the molten salt battery 1, the potential is varied in the range of 0 V to 2.0 V by the charge and discharge.

(Evaluation)

In the case of the above molten salt battery 1, sodium is deposited on the negative electrode 20 at the time of charge. On the other hand, even if sodium is deposited on the aluminum alloy, which is the negative electrode case 42, the aluminum alloy will not be corroded when only sodium ions move from the same aluminum alloy at the time of discharge. However, when the aluminum alloy has a deposited metal thereon, sodium may be deposited on the deposited metal at the time of charge. At this time, the deposited metal and sodium form an alloy and destroy a part of the crystal structure of the aluminum alloy. Further, at the time of discharge, a hole is formed in the part in which the alloy has been present, by the movement of the alloy of the deposited metal and sodium into the molten salt. In this way, the corrosion of the aluminum alloy proceeds.

In the molten salt battery 1, the reduction reaction of sodium ions is most promoted under a condition when the potential of the negative electrode 20 is the lowest. Therefore, the reduction deterioration is evaluated at 0 V. When the potential of the negative electrode 20 is changed from 2 V to 0 V, reduction current is increased. That is, sodium ions are reduced to deposit sodium metal on an aluminum alloy. However, the current value at a potential of 0 V is 10 μA or less for all the samples. The current for all the samples is smaller than the allowable current value of the molten salt battery 1. That is, the corrosion of the aluminum alloy by the reduction of sodium ions rarely occurs.

According to the present embodiment, the following advantages can be obtained.

According to the present embodiment, the positive electrode case 41 and the negative electrode case 42 are formed of an aluminum alloy containing 90% by mass or more of aluminum.

As a result of charge and discharge of the molten salt battery 1, the positive electrode case 41 is in a state where oxidation reaction of aluminum occurs, and the negative electrode case 42 is in a state where reduction reaction occurs. However, the positive electrode case 41 is almost immune to being oxidized in the electrolyte containing sodium ions. Further, sodium metal is deposited on the negative electrode case 42 by the reduction reaction of sodium ions in the electrolyte containing sodium ions. The sodium metal on aluminum is ionized at the time of discharge. However, since the amount of the sodium metal deposited is very small, aluminum is almost immune to deterioration with the dissolution of sodium ions. Therefore, the positive electrode case 41 and the negative electrode case 42 can be formed of an aluminum alloy to thereby suppress the corrosion of the cases.

The strength of an aluminum alloy increases with the addition of metal additives. However, if the ratio of the metal additives exceeds 10% by mass, any of the metal additives may be deposited, thereby reducing the workability of the aluminum alloy. Then, the content of the metal additives can be set to an amount less than 10% by mass to thereby ensure the strength of the accommodation case 40 and maintain the workability of the accommodation case 40.

The embodiment of the present invention may be modified as described below.

According to the results of the above reduction test, it has been shown that the corrosion resistance of an aluminum alloy to a sodium battery is low for the aluminum alloy having a maximum component percentage of Si of 0.8% by mass. If the aluminum alloy has a component percentage of Si of less than 1.5% by mass, the same advantage as in the case of the above test object will be obtained. The reason for this is explained below.

When the component percentage of Si is 1.5% by mass or more, metallic silicon of a Si single phase may be deposited in the aluminum alloy. In this case, the reduction reaction of sodium ions and Si occurs in the negative electrode case 42 to corrode the negative electrode case 42. Then, the accommodation case 40 of the molten salt battery 1 is formed of an aluminum alloy having a component percentage of Si of less than 1.5% by mass. This can suppress the corrosion of the negative electrode case 42.

According to the results of the above oxidation test, it has been shown that the corrosion resistance of an aluminum alloy to a sodium battery is low for the aluminum alloy having a maximum component percentage of Fe of 0.7% by mass. If the aluminum alloy has a component percentage of Fe of less than 1.0% by mass, the same advantage as in the case of the above test object will be obtained. The reason for this is explained below.

When the component percentage of Fe is 1.0% by mass or more, FeAl$_3$ may be deposited in the aluminum alloy. In this case, the FeAl$_3$ corrodes in the positive electrode case 41. Then, the positive electrode case 41 of the molten salt battery 1 is formed of an aluminum alloy having a component percentage of Fe of less than 1.0% by mass. This can suppress the corrosion of the positive electrode case 41.

According to the results of the above oxidation test, it has been shown that the corrosion resistance of an aluminum alloy to a sodium battery is low for the aluminum alloy having a maximum component percentage of Cu of 0.4% by mass. If the aluminum alloy has a component percentage of Cu of less than 0.5% by mass, the same advantage as in the case of the above test object will be obtained. The reason for this is explained below.

When the component percentage of Cu is 0.5% by mass or more, an intermetallic compound phase between Cu and other metal may be formed in the aluminum alloy. In this case, a corrosion reaction of the intermetallic compound phase occurs in the positive electrode case 41. Then, the positive electrode case 41 of the molten salt battery 1 is formed of an aluminum alloy having a component percentage of Cu of less than 0.5% by mass. This can suppress the corrosion of the positive electrode case 41.

According to the results of the above oxidation test and reduction test, it has been shown that the corrosion resistance of an aluminum alloy to a sodium battery is low for the aluminum alloy having a maximum component percentage of Mn of 0.15% by mass. Mn is not significantly dissolved in an aluminum alloy and deposited as $Al_6Mn$ at ordinary temperatures. $Al_6Mn$ is inert to sodium ions similar to aluminum. Therefore, the same advantage as in the case of the above test object will be obtained even if the amount of Mn is increased.

When the component percentage of Mn is 1.5% by mass or more, the percentage of $Al_6Mn$ in the aluminum alloy is increased to reduce the workability of the aluminum alloy. Then, the component percentage of Mn is preferably set to less than 1.5% by mass. This suppresses the distortion caused by poor workability in producing a case. As a result, an accommodation case 40 of the molten salt battery 1 having a small distortion can be formed.

According to the results of the above oxidation test and reduction test, it has been shown that the corrosion resistance of an aluminum alloy to a sodium battery is low for the aluminum alloy having a maximum component percentage of Mg of 2.8% by mass. When the component percentage of Mg is 4% by mass or more, $Al_3Mg_2$ may be deposited in the aluminum alloy. Mg is inert to sodium ions similar to aluminum. Therefore, the same advantage as in the case of the above test object will be obtained even if the amount of Mg is increased.

When $Al_3Mg_2$ is deposited in an aluminum alloy having a component percentage of Mg of 4.0% by mass or more, the workability of the aluminum alloy will be reduced. Then, it is preferred that the accommodation case 40 of the molten salt battery 1 be formed of an aluminum alloy having a component percentage of Mg of less than 4.0% by mass. This suppresses the distortion caused by poor workability in producing the case. As a result, an accommodation case 40 having a small distortion can be formed.

According to the results of the above oxidation test, it has been shown that the corrosion resistance of an aluminum alloy to a sodium battery is low for the aluminum alloy having a maximum component percentage of Cr of 0.35% by mass. If the aluminum alloy has a component percentage of Cr of less than 0.5% by mass, the same advantage as in the case of the above test object will be obtained. The reason for this is explained below.

When the component percentage of Cr is 0.5% by mass or more, $Al_7Cr$ may be formed in the aluminum alloy. In this case, a corrosion reaction of the $Al_7Cr$ occurs in the positive electrode case 41. Then, the accommodation case 40 of the molten salt battery 1 is preferably formed of an aluminum alloy having a component percentage of Cr of less than 0.5% by mass. This can suppress the corrosion of the positive electrode case 41.

According to the results of the above oxidation test, it has been shown that the corrosion resistance of an aluminum alloy to a sodium battery is low for the aluminum alloy having a maximum component percentage of Zn of 0.25% by mass. If the aluminum alloy has a component percentage of Zn of less than 1.0% by mass, the same advantage as in the case of the above test object will be obtained. The reason for this is explained below.

When the component percentage of Zn is 1.0% by mass or more, metal zinc of a Zn single phase may be deposited in the aluminum alloy. In this case, the part forming the Zn single phase is corroded by a reaction with a sodium compound. Then, the accommodation case 40 is formed of an aluminum alloy having a component percentage of Zn of less than 1.5% by mass. This can suppress the corrosion of the accommodation case 40.

According to the results of the above oxidation test and reduction test, it has been shown that the corrosion resistance of an aluminum alloy to a sodium battery is low for the aluminum alloy having a maximum component percentage of Ti of 0.15% by mass. Ti is inert to sodium ions similar to aluminum. Therefore, the same advantage as in the case of the above test object will be obtained even if the amount of Ti is increased.

Ti does not significantly dissolve in an aluminum alloy, but forms $TiAl_3$ at ordinary temperatures. When the component percentage of Ti is 0.2% by mass or more, the percentage of $TiAl_3$ in the aluminum alloy is increased to reduce the workability of the aluminum alloy. Then, the accommodation case 40 is formed of an aluminum alloy having a component percentage of Ti of less than 0.2% by mass. This suppresses the distortion caused by poor workability in producing the case.

The above tests are performed under the conditions in which sodium is used for a counter electrode to promote oxidation. Therefore, even if the accommodation case 40 having the above composition is used as the case of the molten salt battery 1 containing the following sodium compound, the same advantage of the present embodiment is obtained. Examples of the positive electrode active material include $NaCrO_2$ mentioned in the embodiment, $NaMnF_3$, $Na_2FePO_4F$, $NaVPO_4F$, and $Na_{0.44}MnO_2$.

Although NaFSA-KFSA was used as the electrolyte of the molten salt battery 1 in the above Examples, the same results are obtained for the same type of molten salts as this. Therefore, even if the accommodation case 40 having the above composition is used as the case of the molten salt battery 1 using the molten salt shown below as an electrolyte, the same advantage of the present embodiment is obtained.

The molten salt includes a salt in which $R^1$ and $R^2$ are replaced with CF3 (hereinafter, "TFSA") and a salt in which $R^1$ and $R^2$ are replaced with F and CF3, respectively, in the above formula (1). The molten salt further includes a molten salt containing a plurality of anions selected from the group of molten salts in which $R^1$ and $R^2$ in the above formula (1) are independently replaced with F or a fluoroalkyl group.

Further, the molten salt is not limited to a molten salt in which Na or K is used as a cation. The molten salt may be formed by using, as cations, one or two or more selected from the group consisting of alkali metals and alkaline earth metals.

The alkali metals are selected from Li, Na, K, Rb, and cesium Cs. Further, the alkaline earth metals are selected from Be, Mg, Ca, Sr, and Ba.

The simple salt of the molten salt in which FSA is used as an anion includes LiFSA, NaFSA, KFSA, RbFSA, CsFSA, $Be(FSA)_2$, $Mg(FSA)_2$, $Ca(FSA)_2$, $Sr(FSA)_2$, and $Ba(FSA)_2$. A mixture thereof is also used as the molten salt of the molten salt battery 1.

The simple salt of the molten salt in which TFSA is used as an anion includes LiTFSA, NaTFSA, KTFSA, RbTFSA, CsTFSA, $Be(TFSA)_2$, $Mg(TFSA)_2$, $Ca(TFSA)_2$, $Sr(TFSA)_2$, and $Ba(TFSA)_2$. Further, a mixture thereof is also used as the molten salt of the molten salt battery 1.

In each of the above tests, the measurement has been performed at a composition ratio of NaFSA-KFSA of 45 mol % and 55 mol %, respectively. Even if the above composition ratio is changed, the same advantage of the present embodiment is obtained. For example, the molar ratio of KFSA may be set in the range of 0.4 or more and 0.7 or less. The molar ratio of KFSA is represented by the ratio of the number of moles of K-cations to that of the cations in the whole molten salt.

According to the above embodiments, the positive electrode case 41 and the negative electrode case 42 are formed of an aluminum alloy containing a metal other than aluminum. However, these cases can also be formed of pure aluminum.

According to the above embodiments, the accommodation case 40 comprises a positive electrode case 41 and a negative electrode case 42 that are separated from each other. However, the positive electrode case 41 and the negative electrode case 42 can also be integrated to form the accommodation case 40. In this case, at least one of the positive electrode 10 and the negative electrode 20 is electrically isolated from the accommodation case 40 before it is accommodated in the accommodation case 40.

The invention claimed is:

1. A case for a molten salt battery, the case comprising:
a positive electrode case and a negative electrode case that are separated from each other; and
a sealing member for sealing a space between the positive electrode case and the negative electrode case,
wherein the case is formed of an aluminum alloy containing 90% by mass or more of aluminum, and wherein the case is adapted for use with a molten salt battery containing an electrolyte, the electrolyte is comprised of a molten salt containing an anion represented by the following formula (1) and a sodium cation (NaFSA):

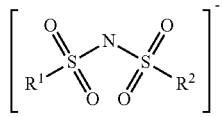

(1)

where $R^1$ and $R^2$ denote fluorine,
wherein the molar ratio of the NaFSA is set in the range of 0.3 or more and 0.6 or less, and
wherein a component percentage of silicon contained as a metal additive in the aluminum alloy is set in the range of 0.25% by mass or more to 0.8% by mass or less,
wherein a component percentage of iron contained as a metal additive in the aluminum alloy is set in the range of 0.40% by mass or more to 0.7% by mass or less,
wherein a component percentage of copper contained as a metal additive in the aluminum alloy is set in the range of 0.05% by mass or more to 0.40% by mass or less,
wherein a component percentage of manganese contained as a metal additive in the aluminum alloy is set in the range of 0.05% by mass or more to 0.15% by mass or less,
wherein a component percentage of magnesium contained as a metal additive in the aluminum alloy is set in the range of 0.05% by mass or more to 2.8% by mass or less,
wherein a component percentage of chromium contained as a metal additive in the aluminum alloy is set in the range of 0.04% by mass or more to 0.35% by mass or less,
wherein a component percentage of zinc contained as a metal additive in the aluminum alloy is set in the range of 0.05% by mass or more to 0.25% by mass or less,
wherein a component percentage of titanium contained as a metal additive in the aluminum alloy is in the range of 0.03% by mass or more to 0.15% by mass or less, and
wherein a maximum potential difference for positive and negative electrodes of the molten salt battery is 3.5 V, and an allowable current density of the aluminum alloy is less than about 10 $\mu Acm^{-2}$, whereby corrosion of the aluminum alloy is suppressed.

2. The molten salt battery case according to claim 1 comprising a molten salt battery.

* * * * *